Figure 1:
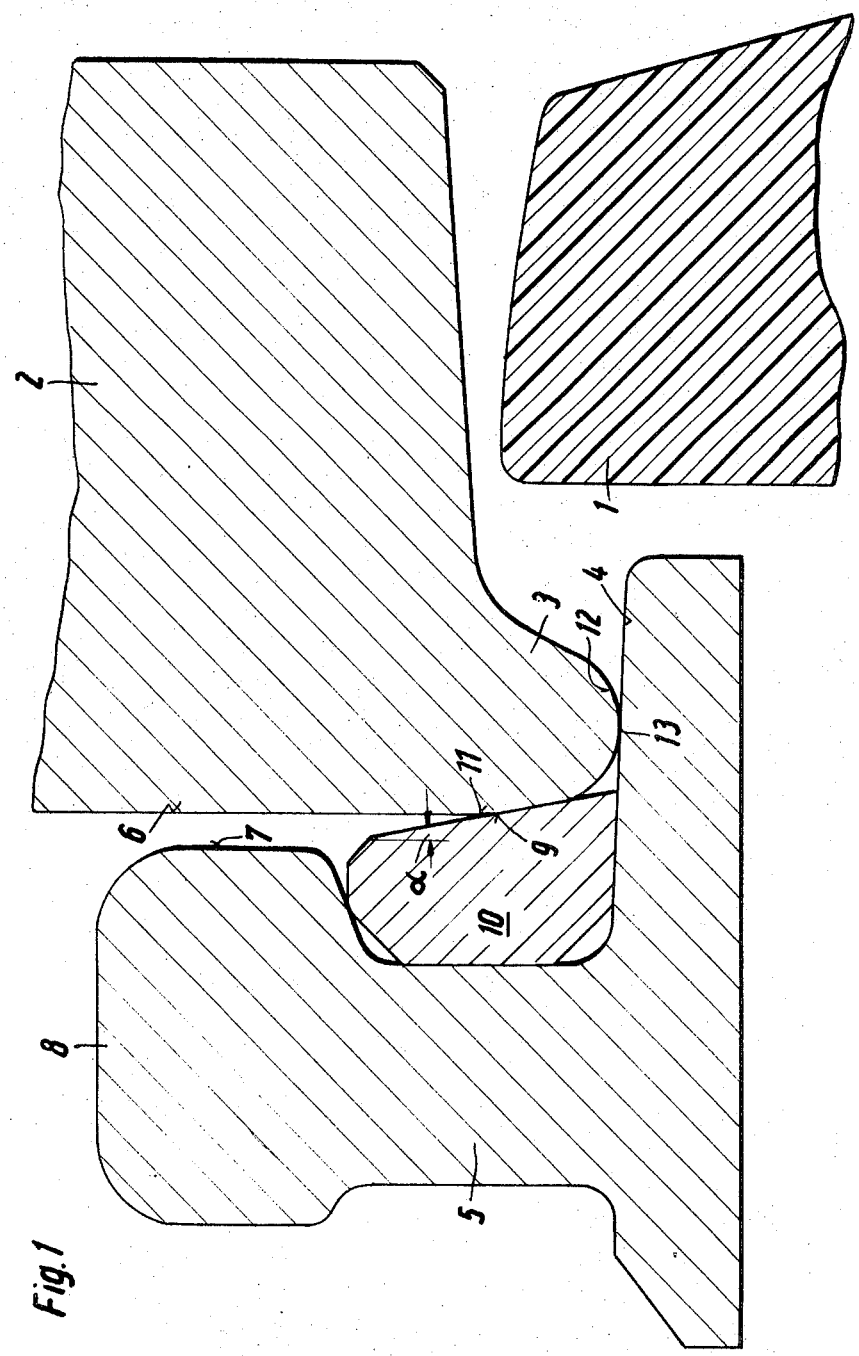

United States Patent
Preinfalk et al.

[15] 3,656,588
[45] Apr. 18, 1972

[54] RUBBER TRACK BRAKE

[72] Inventors: Franz Preinfalk, Langenfeld; Dietmar Ulbricht, Dinslaken; Friedrich Rohrsen, Rodenberg, all of Germany

[73] Assignee: August Thyssen-Hutte Aktiengesellschaft, Duisburg-Hamborn, Germany

[22] Filed: May 19, 1970

[21] Appl. No.: 38,812

[30] Foreign Application Priority Data

May 23, 1969 Germany.................P 19 26 358.2
Dec. 9, 1969 Germany.................P 19 61 604.7

[52] U.S. Cl..................................188/62, 238/15
[51] Int. Cl.................................................B61k 7/02
[58] Field of Search........................238/15-17; 188/62

[56] References Cited
UNITED STATES PATENTS 1,499,743 7/1924 McNamara.........................238/17
3,141,526 7/1964 Wynn.................................188/62
3,311,304 3/1967 Becker...............................238/17
509,788 11/1893 Baker.................................238/17
1,726 8/1840 Naglee...............................238/15
2,779,441 1/1957 Beltman et al....................188/62

Primary Examiner—Arthur L. La Point
Assistant Examiner—Richard A. Bertsch
Attorney—Burgess, Dinklage & Sprung

[57] ABSTRACT

The invention relates to a rubber track brake wherein each steel rail is provided with an element having an inclined surface projecting laterally inwardly so that the flange of a vehicle wheel contacts the surface at only a single point close to the foot of the rail, thereby minimizing friction even as the wheel moves up the surface somewhat under the influence of centrifugal force as when going around a curve.

6 Claims, 2 Drawing Figures

RUBBER TRACK BRAKE

The invention relates to a rubber track brake, especially one to be laid in a curve, having rails of rubber elastic material and steel rails disposed alongside and parallel to the rubber rails, each steel rail having a virtually horizontal running surface for the flanges of the wheels of a vehicle and an approximately perpendicular guiding rail for the sides of the wheels.

In prior-art track brakes of this kind, the two rails of a track are replaced over a certain length by rubber rails which form the brake bodies. The rubber tracks are bonded to a support capable of bearing a load. They are adjustable in height between two positions. The one position, in which the rubber rails are raised, is the braking position; the other position, in which the rubber rails are lowered, is the free-running position. When the rubber rails are in the braking position, the rolling surfaces or flanges of the wheels of a vehicle roll on the rubber rails. The wheels then sink into the elastic rubber brake bodies to a greater or lesser depth depending on the weight of the vehicle, whereupon the vehicle's energy of movement is partially transformed into kneading work. The vehicle is thus retarded when it rolls over the rubber rails. When the vehicle has reached the desired final speed the rubber rails are lowered to the free-running position. In this position the wheels of the vehicle are no longer in contact with the rubber rails. The flanges of the wheels then roll on the steel rails disposed alongside the rubber rails. No braking action takes place when the rubber rails are in the lowered position.

Both in the braking position and in the free-running position, the car is guided by guiding rails. These are also disposed alongside the rubber rails and form a unit with the rails on which the flanges roll in the free-running position. The wheels engage the guiding rails as soon as the motion of the vehicle acquires a transverse component. The guiding rails may not be less than a predetermined height, in order to assure reliable guidance even when a lighter vehicle, i.e., one which does not sink deeply into the rubbery material, passes over the track brake when the rubber rails are in the raised position. In track brakes of the prior art, conventional tongue rail sections lie beside the rubber rails, the base of these tongue rail sections forming the running surface for the wheel flanges in the free-running position, while the side surface of the head forms the surface for guiding the sides of the wheels.

When the wheels of a vehicle are forced against the guiding surfaces, as they unavoidably are by centrifugal force where tracks are laid in curves or in the case of swerving movement of the vehicles, a frictional force develops between the guiding surface and the side of the wheel. This friction force is of secondary importance if the rubber rails are in the braking position, in which case it merely adds slightly to the braking force. The additional friction, however, is extremely undesirable when the vehicle reaches the required final speed and the rubber rails are lowered to the free-running position, because it creates additional undesired braking and can even cause the vehicle to stop in the brake zone.

The object of the invention is to reduce to a negligible amount the additional friction caused by the guiding rails in a system as described.

This is achieved according to the invention by the provision on the guiding rail, in a rubber track brake of the kind described hereinabove, of a lateral enlargement facing the wheel of an oncoming vehicle, the surface of the enlargement tangentially contacting, in the area of the flange, the side of the wheel rolling on the running surface. In a preferred embodiment of the invention, the steel rail consists of a conventional tongue rail section and an additional strip which is inserted into the channel between the rail head and the base of the rail, on the side facing the wheel, and whose projecting side surface forms the lateral enlargement. It is desirable that the surface of the lateral enlargement, which touches the side of the wheel in the area of the wheel flange, be an inclined plane enclosing with the vertical an angle of at least 2° to about 60°.

Desirably the inclined plane at its bottom should be rounded so as to merge smoothly with the substantially horizontal running surface of the rail, the radius of curvature of such rounding being greater than the radius of curvature of the wheel flange in cross section. In a preferred embodiment, the inclined plane encloses with the vertical an angle of 5° to 12°. It is desirable that the upper portion of the lateral surface of the guiding strip associated with the wheel be vertical.

Figure 2:
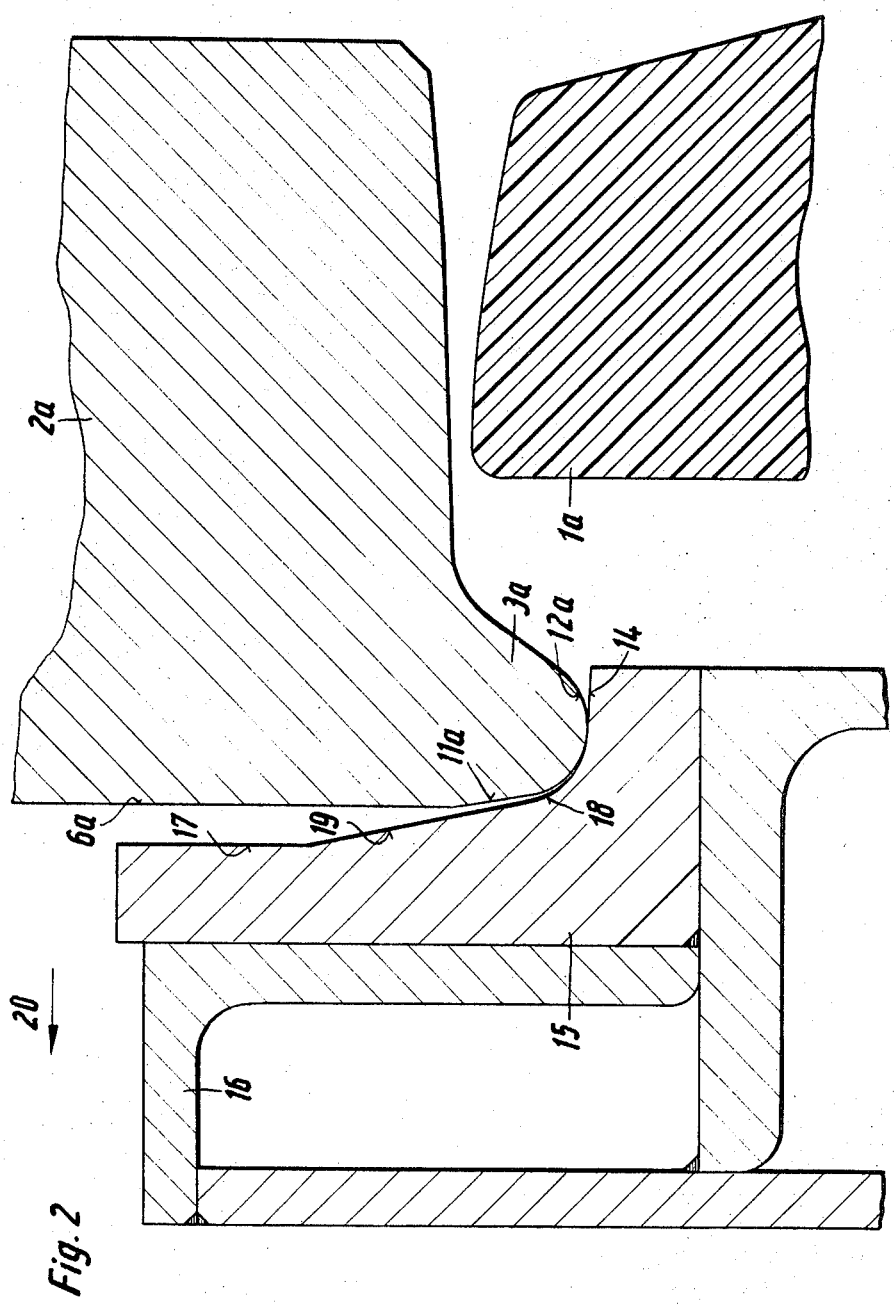

The invention will be further described with reference to the drawings, wherein:

FIGS. 1 and 2 show two different embodiments of the invention in cross section through a rubber braking body with a combination steel rail lying beside it and through a wheel that is in the brake.

Referring now more particularly to the drawings in FIG. 1 the rubber brake body 1 is in the lowered position, out of contact with the wheel 2 of the vehicle passing through it. The flange 3 of wheel 2 rolls on the approximately horizontal surface 4 of the base of a broad-flange rail 5. In contrast to track brakes of the prior art wherein the wheel side 6 is guided against the side surface 7 of the rail head 8, the guidance is here performed against the lateral surface 9 of an additional strip or element 10. The strip 10 is fitted into the channel between the rail head 8 and the rail flange 4 of rail 5 and is bolted in place. The lateral surface 9 has the shape of a steep inclined plane which projects laterally beyond the vertical plane formed by the lateral surface 7 of the rail head 8, toward the wheel 2. Between the lateral surface 9 and the plane that contains the lateral surface 7 there in included an angle $\alpha$. In the embodiment, represented, it amounts to about 12°. By this selection of the angle $\alpha$ the surface 9 contacts the wheel 2 urged against it approximately at that point on the wheel flange 3 at which the slightly tapering side surface 11 of the wheel flange, which ordinarily forms an angle of 7° with the wheel side 6, merges with the surface portion 12 of arcuate cross section. In other words, the point of contact is placed very low. This means that the frictional force lever arm, from the point of contact to the bearing point 13 of the wheel flange is very short, amounting to only a small fraction of what the lever arm would be if the guiding were performed at the lateral surface 7 of the rail head 8. Accordingly, the undesired braking power is extraordinarily low.

The lateral surface of the steel rail that serves for the guidance of the wheel can, of course, be of a different shape—a bolster shape, for example. In any case the important thing is that the contact take place in the area of the wheel flange so that the lever arm of the frictional force will be small. The embodiment shown has the advantage that the rail 5 is of a conventional profile and therefore is easy and inexpensive to procure. The additional strip 10 is also easy to manufacture. When it is worn out, it can easily be removed from the rail 5 and replaced.

In the embodiment of FIG. 2 the rubber rail 1a is again in the lowered inactive position out of contact with the wheel 2a of an oncoming car. The flange 3a of wheel 2a rolls on the approximately horizontal surface 14 of the base of a steel rail 15. This steel rail is formed from a special shape which is made, for example, by planing a billet of rectangular cross section. It is bolted to an understructure 16, which consists of profiled members welded together. The lateral surface of steel rail 15 facing wheel 2a has a portion 17 at the top which is vertical and which is adjoined by a steep inclined planar portion 19 beneath it, which progressively merges with a rounded portion 18 terminating in a horizontal or, better, slightly inclined portion 14. The radius of curvature of the rounded portion 18 is greater than the radius of curvature of the surface of the wheel flange in the immediately adjacent area identified as 12a.

When a car runs centrally through the brake, the wheel flange 3a contacts rail 15 at only one point in the area of the surface portion 14. Now, if one assumes, for example, that rail 15 is the inside rail in a curve, an oncoming vehicle will be urged outward by the centrifugal force, in the direction of the arrow 20. The point of contact between wheel flange 3a and rail 15 will then move upwards along the rounded portion 18, to an extent depending on how far the car is forced outward.

On the corresponding outside rail of the curve, however, the point of contact of the other wheel moves downward slightly. In this manner the rails exercises a guiding force, although there is only a single point of contact between each rail and its wheel. The friction is thus very slight, being practically only rolling friction. Not until the centrifugal action is relatively strong is the wheel forced against rail 15 to such an extent that it contacts it at a second point, namely at the point of transition between the flat wheel side 6a and the gently tapering part 11a of the wheel flange surface. But even in this case the additional, undesirable braking power is slight, since the lever arm of the frictional force is small.

Because the point of contact between rail and wheel moves upward on the inside rail of a track curve and downward on the outside rail, the effective rolling radius of the wheel is reduced on the inside of the curve and increased on the outside. This compensates, to a great extent, the difference in length between the inside rail and the outside rail. In this manner the slippage between wheel and rail, which occurs in other systems with attendant additional friction and increased wear, is virtually excluded.

In the area of the upper portion 17, there is no contact in any case between the guiding rail and the side of the wheel when the brake bodies 1a are lowered. This portion of rail 15 serves only as a guide for the vehicle when the brake bodies are in the raised position. The illustrated rail with the vertical portion 17 has the advantage over a rail in which the inclined plane 19 might be continued all the way to the top that the guidance of a vehicle during the braking action is closer and more precise.

As employed herein "rubber" includes natural and synthetic rubber as well as rubber-like elastic materials whatever their chemical composition.

It will be appreciated that the instant specification and examples are set forth by way of illustration and not limitation, and that various modifications and changes may be made without departing from the spirit and scope of the present invention.

What is claimed is:

1. A rubber track brake, adapted for laying in a curve and for use with a vehicle having flanged wheels, comprising
   A. a first pair of parallel rails having a rubber upper surface,
   B. a second pair of rails respectively alongside said first pair of rails, each of said rails of said second pair having
      a. an approximately vertical guiding surface for the side of the vehicle wheel,
      b. an approximately horizontal running surface for the flange of the wheel, and
      c. a laterally projecting element facing inwardly toward the wheel, the surface of said element contacting the side of said wheel adjacent its flange.

2. A track brake according to claim 1, wherein each rail of said second pair comprises a rail portion having a head and a foot defining a channel there between, and a strip comprising said laterally projecting element, said strip seating in said channel and projecting laterally inward of said head.

3. A track brake according to claim 1, wherein the surface of said element contacting the side of said wheel adjacent its flange is an inclined plane enclosing with the vertical an angle of at least 2° to about 60°.

4. A track brack according to claim 3, wherein the inclined plane merges smoothly through a rounded portion with the approximately horizontal running surface, the radius of curvature of the rounded portion being greater than the radius of curvature of the wheel flange surface in cross section.

5. A track brake according to claim 4, wherein the inclined plane encloses with the vertical an angle of 5° to 12°.

6. A rubber track brake according to claim 1, wherein the upper portion of the surface of said element contacting said wheel side is vertical.

* * * * *